(12) United States Patent
Faulhaber et al.

(10) Patent No.: US 6,581,722 B2
(45) Date of Patent: Jun. 24, 2003

(54) ACOUSTIC ABSORBER AND SOUND-ABSORPTION METHOD

(75) Inventors: Peter Faulhaber, München (DE); Reinhard Pongratz, Taufkirchen (DE)

(73) Assignee: EADS Deutschland GmbH, Munich (DE)

( * ) Notice: Subject to any disclaimer, the term of this patent is extended or adjusted under 35 U.S.C. 154(b) by 71 days.

(21) Appl. No.: 09/768,420

(22) Filed: Jan. 24, 2001

(65) Prior Publication Data

US 2001/0009207 A1 Jul. 26, 2001

(30) Foreign Application Priority Data

Jan. 24, 2000 (DE) .......................... 100 02 984

(51) Int. Cl.⁷ .............................. G10K 11/16
(52) U.S. Cl. ................. 181/250; 181/271; 181/227
(58) Field of Search ................. 181/224, 210, 181/271, 273, 277; 248/59; 381/71.1; 415/119

(56) References Cited

U.S. PATENT DOCUMENTS 3,602,331 A * 8/1971 Bschorr ...................... 181/224
4,715,472 A * 12/1987 McKee ........................ 181/241

FOREIGN PATENT DOCUMENTS

| DE | 4228356 | 10/1995 |
| WO | 9215088 | 9/1992 |

* cited by examiner

*Primary Examiner*—Marlon T. Fletcher
*Assistant Examiner*—David S Warren
(74) *Attorney, Agent, or Firm*—Ladas & Parry

(57) ABSTRACT

An acoustic absorber (10) comprises a housing or wall (11), defining an interior absorber chamber (12) connected by openings (13) to a duct (20) to reduce the sound in the duct (20). The natural frequency and impedance of the absorber (12) are variable, so that the absorber (12) can be adapted to a sound field in the duct (20) in a manner corresponding to the respective operating conditions. Such adaptation is achieved mechanically, for example, by an elastic membrane (15) for varying the volume of chamber (12), or thermally, for example, by a heating wire (14) or a wire braid (17).

15 Claims, 1 Drawing Sheet

ACOUSTIC ABSORBER AND SOUND-ABSORPTION METHOD

FIELD OF THE INVENTION

The present invention relates to an acoustic absorber and to a sound-absorption method for damping sound in a fluid flowing in a duct.

BACKGROUND AND PRIOR ART

Acoustic absorbers are used to reduce sound levels or absorb sound. For example, acoustic absorbers are used to reduce the sound level in aircraft engines, in exhaust gas systems, in air-conditioning systems and in general in fluid flow ducts.

Known acoustic absorber elements, such as liners in aircraft engines or resonators, are made of passive structural members and therefore cannot be adapted during operation, to varying conditions of the sound field. Thus, the known acoustic absorber elements cannot be adapted during operation to altered conditions of the sound and the fluid flow, such as acoustic pressure, fluid composition, flow velocity, turbulence, and the like. With conventional absorbers, therefore, it is not possible to achieve optimal reductions of sound level under different operating conditions.

Adaption by means of electrodynamic, piezoelectric actuators would have the disadvantage of a very complex closed-loop control system. Furthermore, because of their poor robustness, such actuators have only very limited usability in acoustic absorbers.

International Patent WO 92/15088 describes an acoustic damping device in which a resonator can be adjusted to the frequency of the acoustic vibrations. For this purpose, there is disposed in the resonator a movable partition, which can be driven by a drive rod and motor in order to vary the volume in the resonator.

To vary the resonance frequency, it is proposed in German Patent 4228356 C2 that there be provided a resonator neck of variable length and cross section in the form, for example, of a flexible hose, which is stretched by means of a positioning device or a pulling mechanism.

Unfortunately, the known devices and methods suffer from the problem of great structural complexity in order to make the resonator volume adaptable. Furthermore, such systems often lack the necessary robustness with respect to mechanical stresses and strains.

SUMMARY OF THE INVENTION

An object of the present invention is therefore to provide an acoustic resonator which can be adapted to different acoustic conditions, requires relatively little structural complexity and can be designed robustly.

Another object is to provide a sound-absorption method by which an optimal reduction of sound level can be achieved in simple manner under different operation conditions.

These and further objects are achieved by an acoustic absorber comprising a wall defining an interior chamber, the wall having a duct therethrough for conveying a fluid, the wall having an opening providing communication between said duct and said chamber. The chamber has a natural frequency and acoustic impedance to absorb sound in the fluid in the duct. The natural frequency and acoustic impedance of the chamber is adjustable by means of an elastic membrane for varying volume of the chamber and/or a heating element for heating the chamber.

The method is achieved by the steps of connecting a chamber of a sound absorber, to said duct and varying a natural frequency and impedance of said chamber to adjust the sound absorber to the sound in said duct, the varying of the natural frequency and impedance being effected by varying the volume of said chamber by a membrane acting on said chamber, and/or by varying the temperature of the chamber by a heating element disposed in said chamber.

Because of the variable natural frequency and impedance of the absorber, the absorber can be adapted optimally to the surrounding sound field, even during operation under different operating conditions. Thus, an optimal reduction of sound level is achieved. For this purpose a closed-loop control system of only minimal complexity is necessary.

Advantageously the natural frequency of the absorber and the impedance of the absorber can be adjusted mechanically and/or thermally. Thereby optimal adaptation to the surrounding acoustic field can be achieved in particularly simple manner. Furthermore, the acoustic absorber can also be constructed inexpensively. The absorber impedance can be adapted with respect to reactance and resistance.

Preferably, the acoustic absorber comprises an elastic membrane for varying the volume of the absorber chamber. In this regard, the membrane can be acted on pneumatically or hydraulically. Thereby optimal adaptation of the absorber during operation can be accomplished by simple structural means, thus additionally allowing a greater degree of robustness to be achieved.

Advantageously, the acoustic absorber has a heating element for heating the absorber chamber. Such a heating element can be, for example, a zig-zag heating wire or a helical heating wire. This embodiment is particularly robust and inexpensive.

Preferably, the acoustic absorber also comprises a device for varying the flow resistance in the region of the duct openings. Thereby, there can be achieved an even higher degree of adaptation and thus an even further improved reduction of sound level.

As such a device, the acoustic absorber can comprise, for example, a heatable wire screen or wire braid, which is advantageously disposed in the region of the duct openings. Thus, the flow resistance in the region of the openings can be varied by heating the wire screen, thus leading to adaptation of the resistance of the absorber. During heating of the wires or of the wire screen there takes place, for example, a volume variation, which in turn results in a variation of flow resistance. By this feature also there can be achieved even better adaptation of the absorber to the acoustic field.

Advantageously, the acoustic absorber includes a sensor unit for temperature measurement. The sensor unit can be disposed, for example, on the heatable wire braid or wire screen, or on the heating wire in the chamber. Thereby, open-loop control or even closed-loop control of the operating frequency or of the acoustic resistance can be achieved with simple means.

Advantageously, the acoustic absorber is equipped with an open-loop or closed-loop control unit for adjustment of the temperature and/or of the absorber volume.

In a further embodiment, a microphone is additionally provided in the chamber of the absorber in order to detect the working frequency of the absorber and use it as the manipulated variable for a closed-loop control system.

In the sound-absorption method, the volume of the absorber chamber is coupled to the duct in order to absorb a sound field in the duct, the natural frequency and impedance of the absorber being varied in order to adapt the absorber to the sound field in the duct. Thereby, an improved or optimal reduction of sound level can be achieved even under different operating conditions or acoustic properties in the duct. The working frequency range and/or the acoustic impedance of the absorber can be adapted during operation to varying acoustic and flow-related acoustic properties of the sound field to be damped.

Advantageously, the size of the absorber chamber is varied by means of a membrane. In addition, or as an alternative thereto, it is possible to adjust the temperature of the absorber chamber by a heating element under closed-loop control.

Advantageously, the flow resistance between the duct and the absorber chamber can be adjusted, for example, by a heatable wire screen or other means with equivalent effect.

In addition to the advantages described hereinabove, the absorber of the invention can be manufactured simply and inexpensively. The acoustic absorber has light weight and operates reliably even under adverse environmental conditions, such as very high or low temperatures, highly or slightly turbulent flow, greatly fluctuating acoustic pressures and similar constraints. The complexity of the closed-loop control system is slight and the acoustic absorber can be used advantageously for the most diverse technical purposes, such as in aircraft engines, in motor vehicles, in exhaust systems, in air-conditioning systems, and the like.

BRIEF DESCRIPTION OF THE DRAWING

The sole FIGURE of the drawing is a cross-sectional view a preferred embodiment of the invention of an acoustic absorber which is coupled to a duct in order to dampen sound of the fluid flowing in the duct.

DETAILED DESCRIPTION

Figure 1:
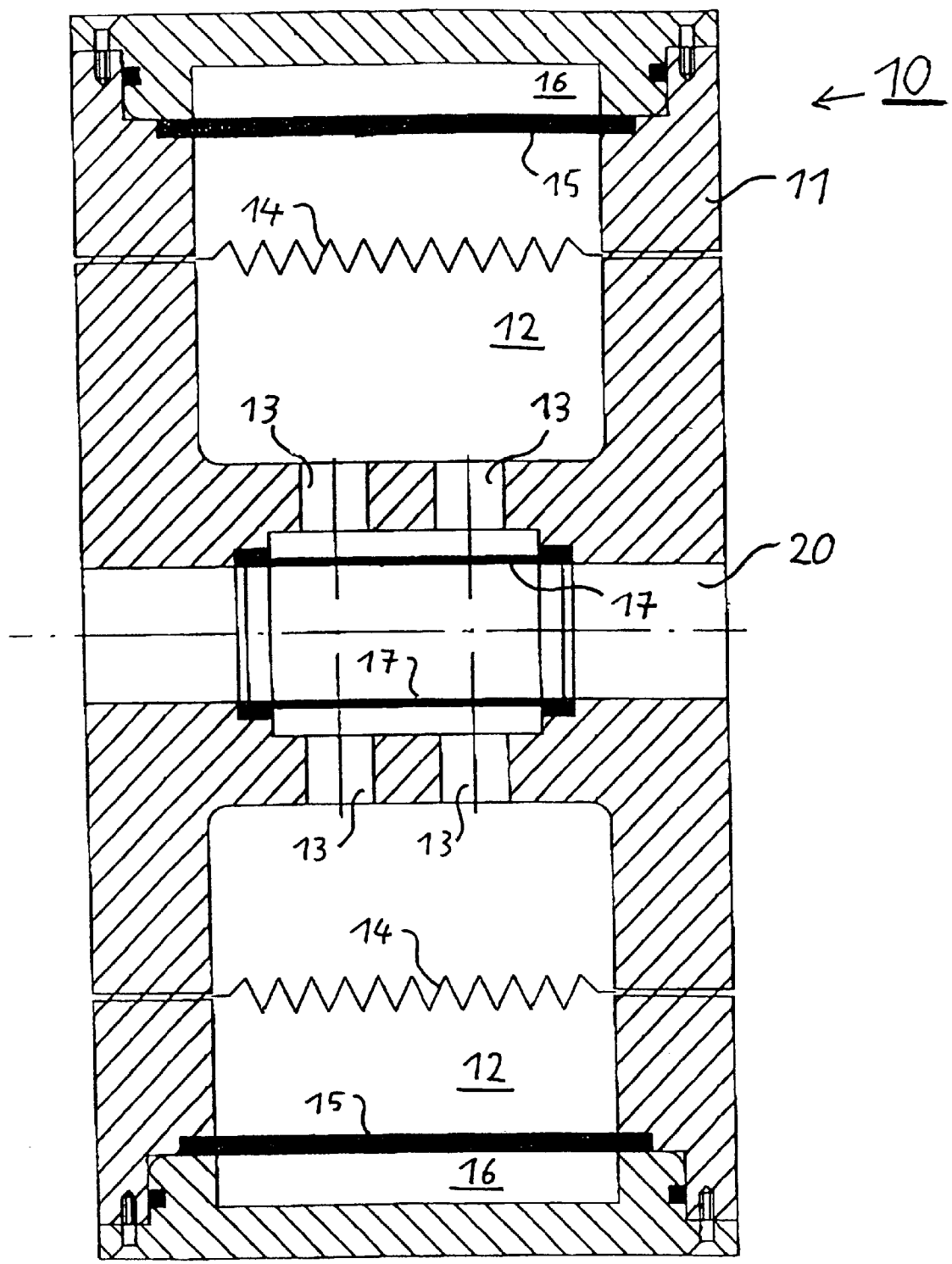

The drawing shows an acoustic absorber 10, which is coupled to a duct 20. Acoustic absorber 10 has a wall of housing 11, which defines an interior space 12. The interior space 12 enclosed by wall 11, forms a chamber serving as an absorber volume. The wall 11 is provided with through holes 13 to couple absorber chamber 12 to duct 20.

The acoustic absorber 10 includes thermal and mechanical elements, for adjusting the natural frequency and impedance of the absorber chamber, so that the absorber can be adapted to a sound field in duct 20. These elements will be described in more detail hereafter.

In the preferred embodiment illustrated in the drawing, acoustic absorber 10 and duct 20 to which it is coupled are designed as an absorber ring. As seen in the drawing, the absorber ring surrounds the sound duct 20. In this embodiment, therefore, acoustic absorber 10 has circular symmetry, around the plane of the drawing (representing the plane of symmetry). In other words, acoustic absorber 10 has the form of a torus, wherein holes 13 are formed by bores that extend radially outward from duct 20 through the adjoining region of wall 11 of acoustic absorber 10 and thus place the interior of duct 20 into communication with the absorber chamber 12.

It is equally possible, however, for acoustic absorber 10 to have a different form that permits it to be suitably coupled to a flow duct. For this purpose coupling on one or more sides is also sufficient, without the need for duct 20 to be entirely surrounded by acoustic absorber 10.

In absorber chamber 12 there is disposed a heating element in the form of a heating wire 14, by which the absorber chamber can be heated to adjust the temperature. Heating wire 14 has a zig-zag or helical form and is connected to a voltage source (not shown). Heating wire 14 extends axially through wall 11, which forms the housing of acoustic absorber 10. When the gas in absorber chamber 12 is heated, the density of the gas located therein varies, resulting in a variation of the speed of sound transmitted therethrough. Thereby, there is established a variation of the working frequency or a variation of the working frequency range of acoustic absorber 10. Furthermore, a variation of acoustic resistance is also obtained when wire 14 is heated and thus the gas in absorber chamber 12 is heated. In this way, the operating frequency range and the acoustic impedance or acoustic resistance of absorber 10 can be adjusted by heating wire 14.

In the illustrated embodiment, acoustic absorber 10 further comprises an elastic membrane 15 as a variable closure bounding absorber chamber 12. The elastic membrane 15 separates absorber chamber 12 from a variable pressurizing chamber 16. Pressurizing chamber 16 is in communication via ducts (not shown) with a pump or compressor device (also not shown). Consequently, the size of pressurizing chamber 16 can be varied to produce deformation of elastic membrane 15. When gas or air is supplied to pressurizing chamber 16, or when the pressure in pressurizing chamber 16 is higher than the pressure in absorber chamber 12, elastic membrane 15 is deformed toward absorber chamber 12 and the volume of absorber chamber 12 is reduced. In the reverse condition, reduced pressure in chamber 16 results in expansion in chamber 12.

Elastic membrane 15 thus forms a means for varying the volume of absorber chamber 12 mechanically or pneumatically. Thereby, the frequency or the working frequency range of acoustic absorber 10 is regulated by appropriate adjustment of the volume of chamber 12. Furthermore, there is established at least a partial variation of the acoustic resistance or of the acoustic impedance of absorber 10.

Heating wire 14 and elastic membrane 15 can be provided individually, i.e. independently of one another, or in combination with one another in acoustic absorber 10. In other words, thermal means or mechanical means or a combination of both can be provided for varying the natural frequency and the impedance of the absorber.

Acoustic absorber 10 further comprises a wire screen or wire braid 17, which is disposed in the region of openings 13. Wire braid 17 is heatable and is disposed in front of openings 13, that is at the boundary between duct 20 and openings 13.

Thus, the wire screen or wire braid 17 can be heated in the immediate vicinity of openings 13. Thereby, the complex flow resistance of wire screen or wire braid 17 upstream from the openings is varied. This produces a variation in the temperature of the gas in openings 13 and, in consequence thereof, a variation of the speed of sound, of the density and of the viscosity of the gas. Thus, wire braid 17 also constitutes a thermally operating means that can vary the working frequency and the acoustic resistance of acoustic absorber 10.

When the wires of wire braid 17 are heated, the volume of the individual wires also varies, leading to a variation of flow resistance. Thereby, the resistance adaptation of acoustic absorber 10 varies, thus also achieving an optimal adaptation of the respective operating conditions or to a variation of the sound in duct 20.

The acoustic absorber 10 is further provided with sensors (not shown) for temperature measurement, for example, on heating wire 14 and/or on wire braid 17. Thereby, there can be achieved a closed-loop control of the heating power via an appropriate electronic closed-loop control unit or closed-loop control device. It is also possible, however, to impose open-loop control of the heating power by preset values.

For open-loop or closed-loop control, characteristic curves representing the relationship between heating current and temperature are determined in experiments. The corresponding data are stored in a computer memory and used for open-loop or closed-loop control of the heating power in the acoustic absorber 10, in order to achieve optimal adaption to the sound-field parameters in the particular application situation or operating condition.

In sound-absorption methods with acoustic absorber 10, the frequency and impedance are adapted mechanically and/or thermally. The volume of absorber 10 is varied by pneumatically activated elastic membrane 15. The acoustic characteristic impedance of the fluid (gas or liquid) in absorber chamber 12 is varied by heating the fluid, for example, by heating the wire 14, which is an electric heating coil. The acoustic characteristic impedance of the fluid in and around openings 13 is varied by heating the fluid by heatable wire screen or wire braid 17 in the immediate vicinity of openings 13. The complex flow resistance of wire braid 17 upstream from openings 13 is varied by heating the wire braid 17 selectively.

The different adjustment options for adaptation of absorber 10 for varying sound conditions can be utilized independently or with one another. In other words, they can be achieved individually or in combination.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A method for absorbing sound in a fluid in a duct, said method comprising the steps of:
    connecting a sound absorbing chamber of a sound absorber to said duct, and
    varying a natural frequency and impedance of said absorbing chamber to adjust the sound absorber to the sound in said duct,
    the varying of the natural frequency and impedance being effected by
    varying the volume of said absorbing chamber by varying pressure in a pressurizing chamber separated by a membrane acting on said absorbing chamber, and
    varying the temperature of the absorbing chamber by a heating element disposed in said absorbing chamber.

2. The method as claimed in claim 1, wherein the fluid in said duct communicates with said absorbing chamber through an opening which connects the duct and the chamber, said method further comprises adjusting flow resistance of the fluid between said duct and said absorbing chamber.

3. The method as claimed in claim 2, wherein said flow resistance is adjusted by heating a wire screen disposed in a flow path of the fluid from the duct to the absorbing chamber.

4. An acoustic absorber comprising a wall in the form of a ring defining an interior chamber, a duct extending axially in said ring for flow of fluid therethrough, radial openings in said wall connecting said duct and said chamber, said chamber having a natural frequency and acoustic impedance to absorb sound in the fluid in the duct, an annular elastic membrane extending across said ring to divide said chamber into an inner absorber chamber which communicates with said opening and an outer pressurizing chamber which is separated from the absorber chamber by said elastic membrane, means for varying pressure in said outer chamber to vary volume thereof and thereby volume of said inner absorber chamber to adjust the natural frequency and acoustic impedance thereof, and a heating element in said absorber chamber for heating fluid therein also to control the volume of said absorber chamber and vary the natural frequency and impedance thereof.

5. The acoustic absorber of claim 4, wherein said elastic membrane forms an outer boundary of said absorber chamber.

6. The acoustic absorber of claim 4, wherein said heating element comprises a plurality of heating wires extending in and across said absorber chamber.

7. The acoustic absorber of claim 4, comprising an annular heatable wire screen between said duct and said opening for varying flow resistance of the fluid from the duct to said absorber chamber.

8. The acoustic absorber of claim 7, wherein said wire screen is coaxial with said duct and forms a porous wall therefor.

9. The acoustic absorber of claim 4, wherein said wall includes an annular portion surrounding said duct, said opening extending radially in said annular portion.

10. The acoustic absorber of claim 7, wherein said wall includes an annular portion surrounding said duct, said opening extending radially in said annular portion.

11. An acoustic absorber comprising a wall defining an interior chamber, an elastic membrane extending across said wall to divide said interior chamber into an inner absorber chamber and an outer pressurizing chamber which is separated from the absorber chamber by said elastic membrane, a duct extending through said wall for flow of fluid therethrough, means for varying volume of said inner absorber chamber to adjust the natural frequency and acoustic impedance thereof, said means including a heating element in said absorber chamber for heating fluid therein and means for adjusting pressure in said pressurizing chamber.

12. The acoustic absorber of claim 11, wherein said means for varying volume of said inner absorber chamber comprises a heating element extending in and across said inner absorber chamber.

13. The acoustic absorber of claim 11, comprises a heatable wire screen between said duct and said opening for varying flow resistance of the fluid from said duct to said absorber chamber.

14. The acoustic absorber of claim 11, wherein said wall includes an annular portion surrounding said duct, said opening extending radially in said annular portion.

15. The acoustic absorber of claim 14, wherein said wall includes an annular portion surrounding said duct, said opening extending radially in said annular portion.

* * * * *